United States Patent [19]

King et al.

[11] Patent Number: 5,342,462
[45] Date of Patent: Aug. 30, 1994

[54] METHOD AND APPARATUS FOR RETREADING A TIRE

[75] Inventors: Michael J. King, Concord; Robert A. Flynn, San Francisco; Henry Torrez, San Leandro, all of Calif.

[73] Assignee: Oliver Rubber Company, Oakland, Calif.

[21] Appl. No.: 96,738

[22] Filed: Jul. 23, 1993

Related U.S. Application Data

[63] Continuation of Ser. No. 908,228, Jul. 2, 1992, abandoned.

[51] Int. Cl.$^5$ .................. B29C 35/00; B29D 30/08; B29D 30/54
[52] U.S. Cl. .................. 156/96; 156/128.1; 156/909; 425/20; 425/47
[58] Field of Search .......... 425/39, 46, 54, 14, 425/17, 19, 20, 25, 46, 47, 451.7; 156/110.1, 125, 126, 128.1, 394.1, 412, 421, 95, 96, 909; 264/36, 326, 501, 502, DIG. 74; 249/152, 178, 179, 180, 181

[56] References Cited

U.S. PATENT DOCUMENTS

| | | | |
|---|---|---|---|
| 1,328,676 | 1/1920 | Krannich | 425/51 |
| 2,840,857 | 7/1958 | Lett | 425/20 |
| 3,983,193 | 9/1976 | Wulker et al. | 425/24 |
| 3,999,907 | 12/1976 | Pappas | 425/47 |
| 4,058,422 | 11/1977 | Taylor | 156/96 |
| 4,588,460 | 5/1986 | Magee | 156/96 |
| 4,767,480 | 8/1988 | Goldstein | 156/96 |
| 4,946,554 | 8/1990 | Magee et al. | 425/20 |
| 5,053,094 | 10/1991 | Detwiler | 156/96 |

*Primary Examiner*—Michael W. Ball
*Assistant Examiner*—Richard Crispino
*Attorney, Agent, or Firm*—Baker & Botts

[57] ABSTRACT

A tire recapping and retreading method and apparatus that includes a rigid, segmented tread mold. The mold is retained in place over the tire carcass and uncured tread material by a resilient elastic tension band or prestressed metal tension springs. Further retaining force is provided by a resilient envelope to complete the formation of the retread when the tire and apparatus is placed in a hot air oven. The use of the rigid segmented mold described eliminates the distortion of the tire carcass by the mold.

16 Claims, 2 Drawing Sheets

METHOD AND APPARATUS FOR RETREADING A TIRE

CROSS REFERENCE TO RELATED APPLICATIONS

This application is a continuation of application Ser. No. 07/908,228 filed Jul. 2, 1992, entitled "Method and Apparatus for Retreading a Tire" by Michael J. King, Robert A. Flynn and Henry (nmi) Torrez, now abandoned.

TECHNICAL FIELD OF THE INVENTION

This invention relates generally to a method and apparatus for retreading a prepared tire carcass. More particularly, but not by way of limitation, this invention relates to an improved method and apparatus for retreading a prepared tire carcass utilizing a tread mold that includes a plurality of rigid mold segments arranged to be located around the retreading material.

BACKGROUND OF THE INVENTION

In the past, heavy duty mechanical and/or hydraulic closing devices were utilized with the retread molds during the formation of a new tread in retreading material on radial tire carcasses. The use of such closing devices required apparatus that is extremely heavy and expensive. Further, tire distortion frequently occurs when the molds are closed on the tire. This was particularly true if the tires were slightly large in diameter. In such cases, the tire would often buckle and thus could no longer be used.

Another method of recapping or retreading tires is illustrated in U.S. Pat. No. 4,767,480 issued Aug. 30, 1988 to Leon C. Goldstein. In that patent, there is described apparatus and method for recapping or retreading that uses a cold process. In that process, a flexible tread mold is utilized that is stretched over the tire carcass. Subsequently, an envelope is placed over the mold and tire assembly and the entire unit is placed in a chamber where curing of the rubber is accomplished by inflation of the tire carcass, evacuation of the envelope and pressurization of the chamber and the application of heat.

U.S. Pat. No. 5,053,094 issued Oct. 1, 1991 to Richard H. Detwiler illustrates a method of retreading a tire wherein an uncured rubber layer is placed between the tire carcass and the undersurface of a precured tread layer held in place by prestressed bands that are constructed from a synthetic polymer. The bands are tensioned to exert a force on the precured tread layer so that the tread layer is adhered to the carcass by the uncured rubber as it cures in a curing chamber.

U.S. Pat. No. 4,588,460 issued May 13, 1986 to Arthur W. McGee, et al. illustrates a method and apparatus for retreading a tire that includes a relatively flexible mold that may be formed of a plurality of segments. The ends of adjacent mold segments may include guides so that the mold, when closed, will form a circle about the tire to be retreaded. In this process, an elastic band may encircle the segmented mold for the purpose of holding the mold in position on the tire during handling such as when the envelope is placed over the tire which ultimately is pressurized to force the mold segments into the uncured rubber tread material encircling the tire.

SUMMARY OF THE INVENTION

It is an object of this invention to provide new method and apparatus for retreading radial tires that eliminates the need of a pressure closing device. The system of the invention utilizes apparatus that is relatively light in weight and inexpensive and provides retreaded tire that can be cured in existing hot air chambers.

A further object of the invention is to provide a method and apparatus for retreading radial tires that avoids deforming the tire carcass when the mold is placed thereon and thus reduces tire loss during the retreading operation.

This invention then provides, in one aspect, apparatus for retreading a prepared tire carcass having a layer of retreading material located around the exterior thereof. The by-product utilizes a tread mold that includes a plurality of rigid mold segments arranged to be located around the layer of retreading material. The apparatus also includes a resilient, elastomeric retainer that encircles the segmented tire mold urging the mold segments toward the carcass to form the tread in the layer of retreading material during curing.

In another aspect, this invention provides a method for retreading a prepared tire carcass that includes the steps of encircling the prepared tire carcass with a layer of uncured rubber, encircling the uncured rubber and carcass with a segmented tread mold, and placing an elastic retaining member around the mold to resiliently hold the mold in encircling relationship with the rubber, forcing the mold into the rubber to form the tread, and curing the rubber.

BRIEF DESCRIPTION OF THE DRAWINGS

The foregoing and additional objects and advantages of the invention will be more fully understood when read in conjunction with the accompanying drawing wherein like reference characters denote like parts in all views and wherein.

DETAILED DESCRIPTION OF THE INVENTION

Figure 1:
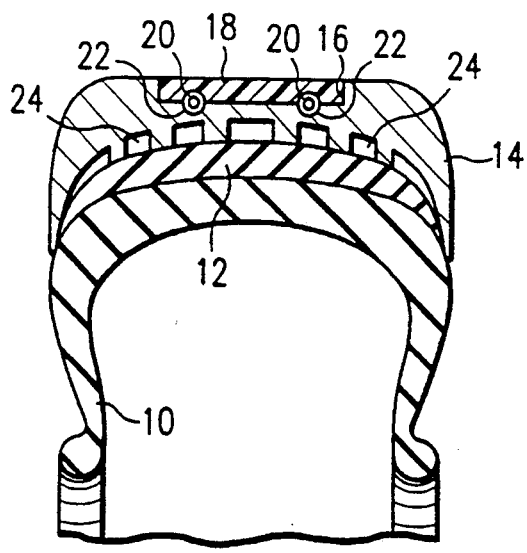
FIG. 1 is a cross-sectional view of a tire being retreaded utilizing the apparatus and method of the invention.

Referring to the drawing and to FIG. 1 in particular, shown therein is a prepared tire carcass 10 having a layer of uncured tread rubber 12 positioned on top of the carcass 10. A layer of adhesive or similar bonding material (not shown) may be disposed between the tread material 12 and the carcass 10 if desired. Located on top of the tread material 12 is a tread mold 14 having a groove 16 formed in the outer periphery thereof. The groove 16 is sized to receive an elastomeric tension band 18 and may also include one or more tension springs 20 that are located in grooves 22 formed in the segments of the tread mold 14. Also, as may be seen in the lower surface of the tread mold 14, a tread pattern 24 is formed on the inside of a tread mold 14.

Figure 2:
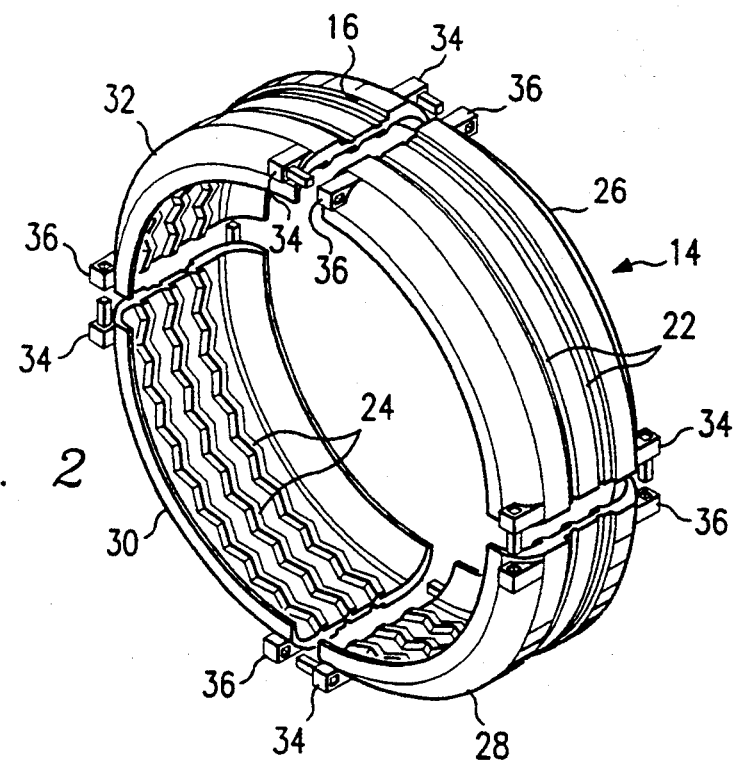
FIG. 2 is a pictorial view illustrating a segmented, rigid mold that is constructed in accordance with the invention.

The tread pattern 24 can be seen more clearly in the pictorial view of FIG. 2. As illustrated in FIG. 2, the tread mold 14 is formed of a plurality of segments 26, 28, 30 and 32. Four segments are illustrated, but as many as twenty mold segments can be easily tolerated and at least six mold segments are preferred. Between each of the mold segments, there is provided an alignment pin 34 and an alignment receptacle 36. The alignment pin 34 and receptacle 36 are provided so that the ends of the mold segments will align when assembled to assure that the assembled tread mold 14 is circular in configuration.

Figure 3:
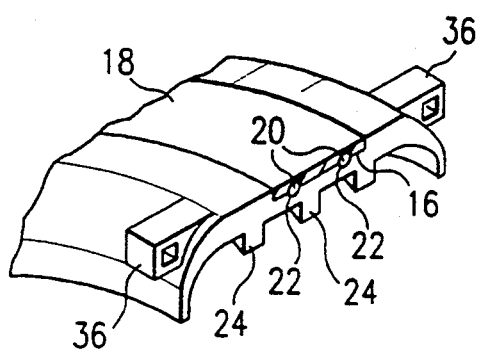
FIG. 3 is an enlarged fragmentary view illustrating a portion of the mold of FIG. 2 with a tension band and tension springs located thereon.

The enlarged fragmentary view of FIG. 3 illustrates more clearly the arrangement of the tension band 18 and of the tension springs 20 in the tread mold 14. As clearly shown therein, the tension band 18 is located in the groove 16 with the tension springs 20 being located in the annular grooves 22 formed in the lower surface of the groove 16.

Figure 4:
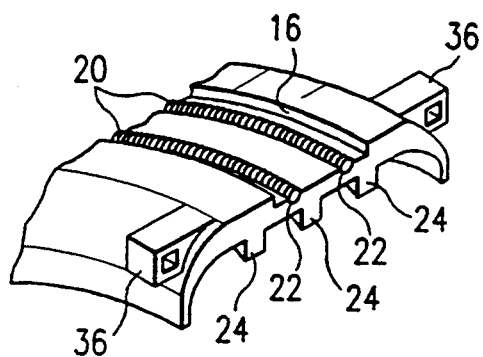
FIG. 4 is a view similar to FIG. 3, but having the tension band removed.

FIG. 4 shows the tension band 18 removed. The tension springs 20 are clearly shown disposed in the grooves 22 in the tread mold 14.

Figure 5:
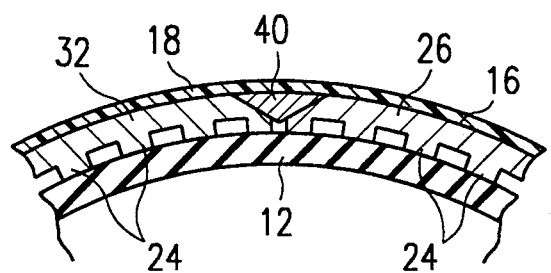
FIG. 5 is a fragmentary cross-sectional view illustrating a wedge that may be utilized between adjacent ends of the segments of the tread mold.

FIG. 5 shows an optional wedge 40 that can be disposed between adjacent ends of all the segments of mold 14. As illustrated in FIG. 5, the wedge 40 is disposed between adjacent ends of the segments 26 and 32 and within the tension band 18. The purpose of the wedge 40 is to prevent extrusion of the uncured tread material 12 between the adjacent ends of the mold segments before the mold is fully closed. The more mold segments that are utilized in the mold, the less space there will be between adjacent ends of the mold segments. Consequently, wedges 40 may be omitted when a large number of mold segments are utilized because the spaces between the mold segments will be very small.

In a process utilizing the apparatus of the invention, the tire carcass 10 is prepared to receive the tread material 12. After proper preparation, the layer of uncured tread material 12 is applied to the outer circumference of the tire as shown in FIG. 1 with or without a bonding agent therebetween. After the tread material 12 is in place, the segments of the tread mold 14 are placed over the uncured tread material 12 with the tread pattern 24 engaging the outer surface of the tread material 12.

To retain the segments of the tread mold 14 in place, and to urge the tread pattern 24 into the tread material 12, tension springs 20 stretched over the circumference of the tread mold 14 and located in the annular grooves 22 formed therein. The springs 20 serve to provide force on the segments of the mold 14 in addition to that exerted by the tension band 18. The band 18 is also stretched over the circumference of the assembled tread mold 14 and located in the annular groove 16 formed in the outer surface of the tread mold 14.

During the assembly of the tread mold 14, wedges 40 will be inserted between adjacent ends of the mold segments if needed. Also, the alignment pins 34 will be inserted into the receptacles 36 as each adjacent segment is assembled to assure the circular configuration of the assembled tread mold 14.

Figure 6:
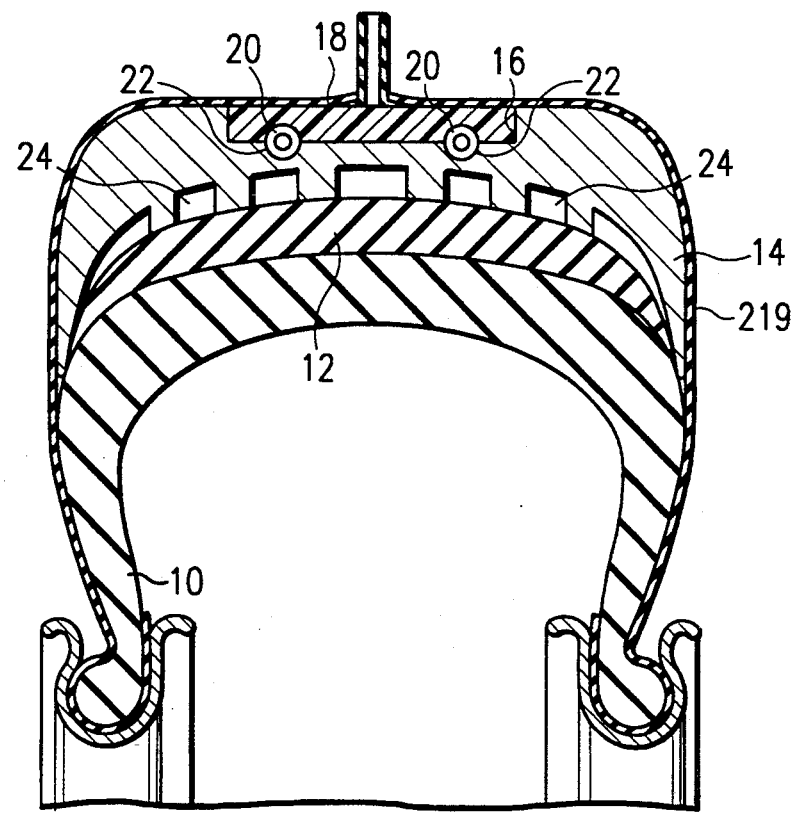
FIG. 6 is a cross-sectional view of a segmented rigid tread mold and tire carcass disposed within a pressure envelope in accordance with the present invention.

After assembly of the apparatus as described above, a pressure envelope 219, as shown in FIG. 6, is stretched over the assembled mold structure and pressurized to provide the final force for driving the tread pattern 24 into the outer surface of the uncured tread material 12. The assembled apparatus with the tire carcass is then placed in a hot air chamber until the uncured tread material is cured.

From the foregoing description, it will be appreciated that utilization of the structure of the invention in the method described, permits the retreading of tires without the necessity for distorting the tire carcass nor requiring the use of expensive mold stretchers. The entire operation can be performed simply and quickly to effectively retread tires.

It will also be understood that the foregoing detailed description is presented by way of example only and that many changes and modifications can be made thereto without departing from the spirit or scope of the invention.

What is claimed is:

1. Apparatus for retreading a prepared tire carcass having uncured retreading material located around the exterior of said tire carcass comprising:
   a tread mold including a plurality of rigid mold segments arranged to expand and contract relative to each other and for allowing said segmented tire mold to expand and contract radially around said retreading material;
   resilient retaining means encircling said segmented tire mold for urging said mold segments toward said tire carcass and for retaining said segmented tire mold as a whole while allowing said segments to expand and contract radially relative to each other; and
   a pressure envelope for placement over said mold segments and said tire carcass.

2. The apparatus of claim 1 further comprising a wedge located between the ends of adjacent mold segments for preventing extrusion of uncured retreading material between the ends of said adjacent mold segments.

3. The apparatus of claim 1 wherein said retaining means includes at least one annular tension spring encircling said model.

4. The apparatus of claim 3 wherein each mold segment has at least one annular groove in an outer surface and said annular spring is located in said groove.

5. The apparatus of claim 4 wherein said retaining means include a band formed from an elastomeric sized to encircle said mold.

6. The apparatus of claim 4 further comprising a wedge located between the ends of adjacent mold segments for preventing extrusion of uncured retreading material between the ends of said adjacent mold segments.

7. The apparatus of claim 6 wherein said retaining means include a band formed from an elastomeric sized to encircle said mold.

8. The apparatus of claim 5 and also including alignment means on adjacent mold segments operably engageable to locate said mold segments in a circular disposition encircling said carcass.

9. The apparatus of claim 8 wherein said retaining means include a band formed from an elastomeric sized to encircle said mold.

10. The apparatus of claim 1 and also including alignment means on the exterior of adjacent mold segments operably engageable to locate said mold segments in a circular disposition encircling said tire carcass.

11. The apparatus of claim 10 wherein said retaining means includes at least one annular tension spring.

12. The apparatus of claim 1 wherein said retaining means include a band formed from an elastomeric sized to encircle said mold.

13. The apparatus of claim 12 wherein said retaining means includes at least one annular tension spring.

14. A method for retreading a prepared tire carcass including the steps of:

encircling the prepared tire carcass with a strip of uncured rubber;

encircling the uncured rubber and the prepared tire carcass with a rigid segmented tread mold including retaining means having at least one tension spring encircling said rigid segmented mold, to allow radial expansion of said rigid segmented mold and contraction of said rigid segmented mold about the prepared tire carcass;

placing an elastic pressure envelope around said retaining means, said rigid segmented mold and the prepared tire carcass to resiliently hold the rigid segmented mold in encircling relationship with said uncured rubber and forcing said rigid segmented mold into said uncured rubber;

applying pressure to the elastic pressure envelope to force said rigid segmented mold into said uncured rubber; and curing said uncured rubber.

15. Apparatus for retreading a prepared tire carcass having uncured retreading material located around the exterior of said tire carcass comprising:

a tread mold including a plurality of rigid mold segments arranged to expand and contract relative to each other and for allowing said segmented tire mold to expand and contract radially for mounting said segmented tire mold on said retreading material;

retaining means including at least one tension spring encircling said segmented tire mold for allowing expansion radially of said segmented tire mold and contraction of said segmented tire mold, whereby said retaining means urges said rigid mold segments toward said tire carcass; and a pressure envelope for placement over said mold segments and said tire carcass following mounting of said segmented tire mold on said retreading material.

16. The apparatus of claim 15 wherein said segmented tire mold further comprises ten rigid mold segments.

* * * * *

UNITED STATES PATENT AND TRADEMARK OFFICE
CERTIFICATE OF CORRECTION

PATENT NO. : 5,342,462
DATED : August 30, 1994
INVENTOR(S) : King, et al.

It is certified that error appears in the above-identified patent and that said Letters Patent is hereby corrected as shown below:

Column 4, line 43, delete "model", and insert -- mold --.

Signed and Sealed this

Second Day of May, 1995

BRUCE LEHMAN

Attest:

Attesting Officer

Commissioner of Patents and Trademarks